US008641207B2

(12) United States Patent
Amano et al.

(10) Patent No.: US 8,641,207 B2
(45) Date of Patent: Feb. 4, 2014

(54) PROJECTION-TYPE IMAGE DISPLAY DEVICE AND PROJECTION-TYPE IMAGE DISPLAY SYSTEM (75) Inventors: Ryuhei Amano, Hirakata (JP); Takashi Miwa, Higashiosaka (JP); Yoshihiro Yokote, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/184,593

(22) Filed: Jul. 18, 2011

(65) Prior Publication Data
US 2011/0267589 A1 Nov. 3, 2011

Related U.S. Application Data (63) Continuation of application No. 11/862,784, filed on Sep. 27, 2007.

(30) Foreign Application Priority Data

Sep. 29, 2006 (JP) .................................. 2006-269965
Sep. 3, 2007 (JP) .................................. 2007-228102

(51) Int. Cl.
*G03B 21/28* (2006.01)
*G03B 21/14* (2006.01)
*G03B 21/22* (2006.01)
*G02B 5/08* (2006.01)

(52) U.S. Cl.
USPC ............................... 353/98; 353/119; 359/838

(58) Field of Classification Search
USPC .................... 353/99, 98, 77, 78, 72, 74, 119; 348/794; 352/242; 359/858, 838, 850
See application file for complete search history.

(56) References Cited

U.S. PATENT DOCUMENTS

| 6,394,610 | B2* | 5/2002 | Rodriguez, Jr. ............... 353/79 |
| 7,097,310 | B2* | 8/2006 | Perkins et al. ................ 353/99 |
| 7,360,906 | B2* | 4/2008 | Onishi et al. ................. 353/119 |
| 2005/0088622 | A1* | 4/2005 | De Vaan et al. ............... 353/31 |
| 2006/0193036 | A1* | 8/2006 | Suzuki ........................ 359/364 |

* cited by examiner

*Primary Examiner* — William C Dowling
*Assistant Examiner* — Ryan Howard
(74) *Attorney, Agent, or Firm* — Marvin A. Motsenbocker; MOTS Law, PLLC (57) ABSTRACT A projection-type image display device includes an image light generator configured to generate image light, a projection optics configured to project the image light onto a screen. The projection optics includes a reflection mirror configured to reflect the image light toward the screen, the image light outputted from the image light generator. A projection-type image display device includes a protective cover provided on an optical path of the image light reflected by the reflection mirror. The protective cover has a transmissive region transmitting the image light reflected by the reflection mirror.

14 Claims, 12 Drawing Sheets

PROJECTION-TYPE IMAGE DISPLAY DEVICE AND PROJECTION-TYPE IMAGE DISPLAY SYSTEM

CROSS REFERENCE TO RELATED APPLICATIONS

This application is a continuation of application Ser. No. 11/862,784, filed on Sep. 27, 2007, which is based upon and claims the benefit of priority from the prior Japanese Patent Application No. 2006-269965, filed on Sep. 29, 2006 and the prior Japanese Patent Application No. 2007-228102, filed on Sep. 3, 2007; the entire contents of both of which are incorporated herein by reference.

BACKGROUND OF THE INVENTION

1. Field of the Invention

The present invention relates to a projection-type image display device and a projection-type image display system, each of which include a projection optics projecting image light onto a screen.

2. Description of the Related Art

Conventionally, there has been known a projection-type image display device having an optical modulator configured to modulate light emitted from a light source and a projection lens configured to project light, which is outputted from the optical modulator onto a screen.

To display a larger image on a screen, it is needed to take a longer distance between the projection lens and the screen. Regarding this background, there has been proposed a projection-type image display system configured to shorten the distance between a projection-type image display device and a screen by utilizing a reflection mirror reflecting light, which is outputted from the projection lens, toward the screen (see, for example, Japanese Patent Publication No, 2004-45894 (claim 1, FIG. 2, and the like)).

When the distance between the projection-type image display device and the screen is shortened, the projection-type image display device comes close to the screen and thus comes into sight of users. For this reason, an oblique projection is needed from an upper, lower, or lateral side of the screen. For example, in the above-mentioned projection-type image display system, positions of the optical modulator and the projection optics are shifted in vertical directions and a convex mirror is used as a reflection mirror, so that a projection distance is shortened and the oblique projection is performed with a shortened projection distance.

In addition, to shorten the distance between the projection-type image display device and the screen, the reflection mirror is disposed in such a position at such an angle that light outputted from the projection lens can obliquely enter the screen. For example, in the above-mentioned projection-type image display system, a convex lens is used as the reflection mirror to shorten the distance between the projection-type image display device and the screen.

To properly display an image on a screen, the positioning of the reflection mirror is an element of substantial importance. Accordingly, when a user touches the reflection mirror, an angle or the like of the reflection mirror is changed, which obstructs proper display of an image to be projected on the screen.

SUMMARY OF THE INVENTION

In an aspect of the present invention, a projection-type image display device (a projection-type image display device 30) includes an image light generator (an image light generator 40), a projection optics (a projection optics 300) having a reflection mirror (an aspherical mirror 50), and a protective cover (a protective cover 60). The image light generator generates image light, and the projection optics projects the image light onto a screen (a screen 11). The reflection mirror in the projection optics reflects the image light, which is outputted from the image light generator, toward the screen. The protective cover is provided on an optical path of the image light reflected by the reflection mirror, and has a transmissive region transmitting the image light reflected by the reflection mirror.

According to this aspect, since the protective cover is provided on the optical path of the image light reflected by the reflection mirror, a user is less likely to touch the reflection mirror and change an angle and the like of the reflection mirror. Here, because the protective cover has the transmissive region transmitting the image light reflected by the reflection mirror, the image light to be irradiated on the screen will not be interrupted by the protective cover.

Thus, even when the image light is being projected on the screen, the positioning accuracy of the reflection mirror provided to shorten the distance between the projection-type image display device and the screen can be preferably maintained.

In the above aspect of the present invention, the reflection mirror condenses the image light outputted from the image light generator between the reflection mirror and the screen. The transmissive region of the protective cover is disposed in the vicinity of a position where the image light is condensed by the reflection mirror (a light-condensing surface a).

In the above aspect of the present invention, the protective cover has an opening (an opening 161) communicating from the reflection mirror aide to the screen side. The transmissive region is the opening.

In the above aspect of the present invention, at least one portion of the protective cover is formed of a light transmitting member and the transmissive region is formed of the light transmitting member.

In an aspect of the present invention, a projection-type image display system (a projection-type image display system 100) includes a screen (a screen 11), an image light generator (an image light generator 40), a projection optics (a projection optics 300) having a reflection mirror (an aspherical mirror 50), and a protective cover (a protective cover 60). The image light generator generates image light, and the projection optics projects the image light onto the screen. The reflection mirror in the projection optics reflects the image light, which is outputted from the image light generator, toward the screen. The protective cover is provided on an optical path of the image light reflected by the reflection mirror, and has a transmissive region transmitting the image light reflected by the reflection mirror.

DESCRIPTION OF THE PREFERRED EMBODIMENTS

A projection-type image display device according to each embodiment of the present invention will be described below by referring to the drawings. Note that same or similar reference numerals denote same or similar portions in the drawings.

Note that the drawings are merely schematic and proportions of sizes and the like are different from actual ones. Thus, specific sizes and the like should be determined by referring to the description below. In addition, needless to say, portions are included where relationships or proportions of sizes of the drawings differ among the drawings.

First Embodiment

Configuration of a Projection-Type Image Display System

Figure 1:
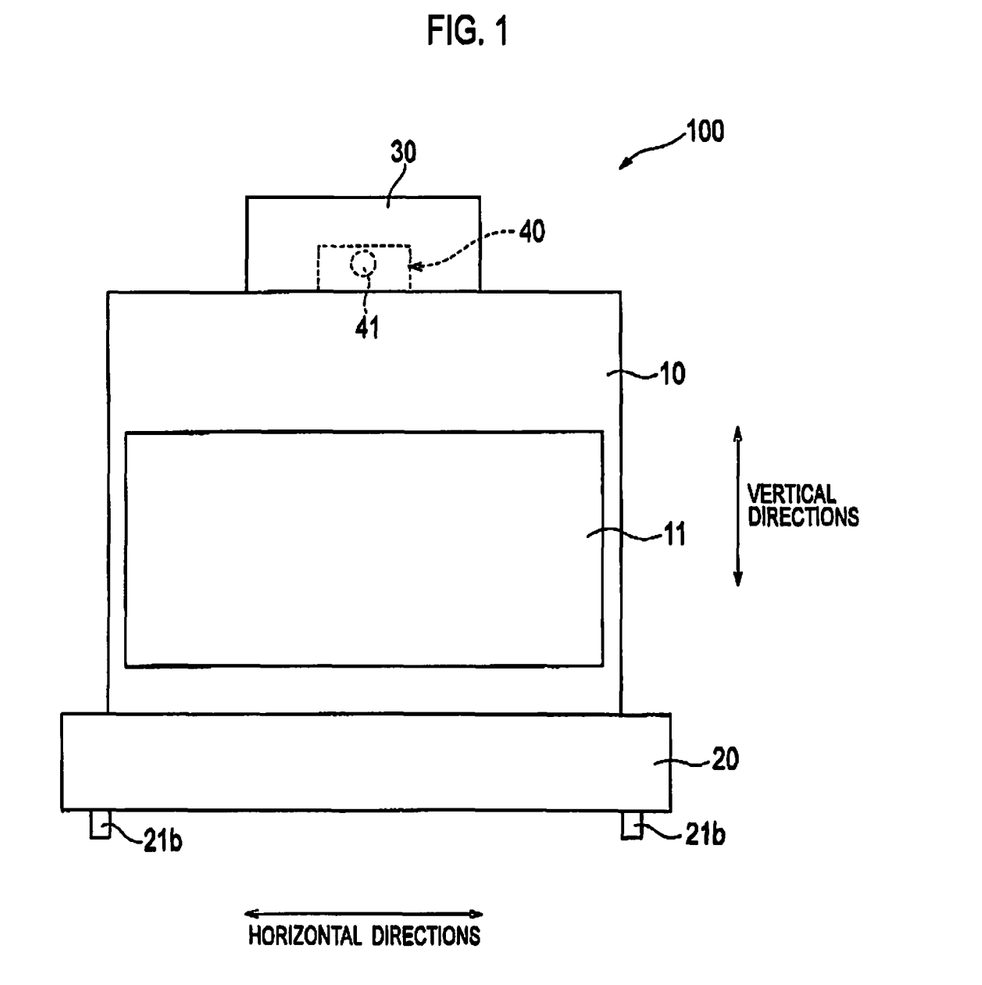
FIG. 1 is a view (seen from the front) showing a configuration of a projection-type image display system 100 according to a first embodiment.
Figure 2:
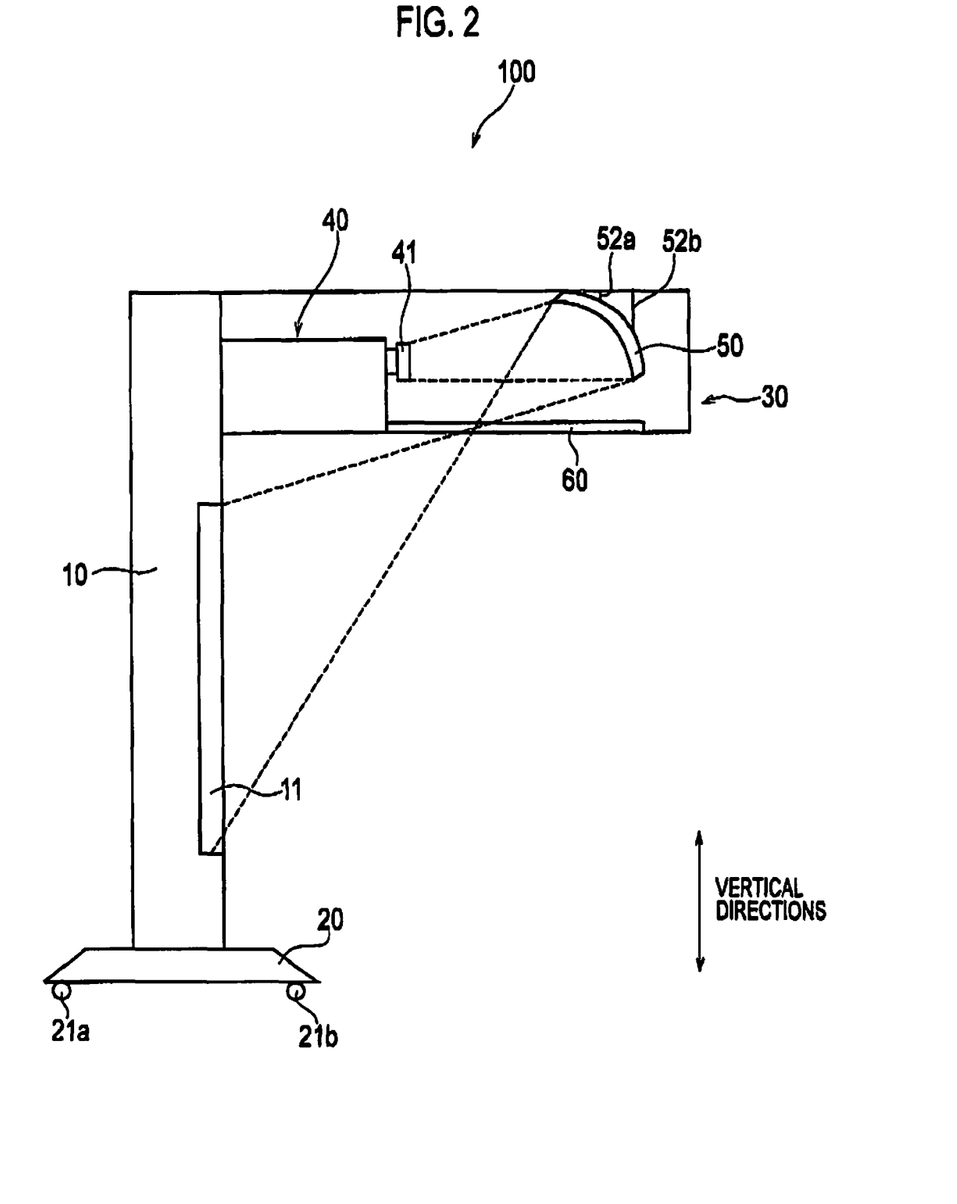
FIG. 2 is a view (seen from a side) showing a configuration of the projection-type image display system 100 according to the first embodiment.

A configuration of a projection-type image display system according to a first embodiment of the present invention will be described below by referring to the drawings. FIG. 1 is a view (seen from the front) showing a configuration of a projection-type image display system 100 according to the first embodiment. FIG. 2 is a view (seen from a side) showing a configuration of the projection-type image display system 100 according to the first embodiment.

As shown in FIGS. 1 and 2, the projection-type image display system 100 has a body 10, a base 20, and a projection-type image display device 30.

The body 10 has a shape extending in the vertical direction of the projection-type image display system 100. The body 10 has a screen 11 onto which an image is projected.

The base 20 is provided on a lower surface of the body 10 and supports the body 10. The base 20 has wheels 21a and 21b which make the projection-type image display system 100 movable.

The projection-type image display device 30 has an image light generator 40, a projection lens 41, an aspherical mirror 50, and a protective cover 60. The projection-type image display device 30 is provided on an upper portion of the body 10. Here, the projection lens 41 and the aspherical mirror 50 configure a projection optics 300 as will be described later (see, FIG. 3).

Note that in the first embodiment, the projection-type image display device 30 is provided on an upper portion of the body 10 but the configuration is not limited to this.

Specifically, the projection-type image display device 30 may be provided on a lower portion of the body 10. In this case, the projection-type image display device 30 is disposed upside down.

In addition, the projection-type image display device 30 may be provided in the left or right portion of the body 10. In this case, the projection-type image display device 30 is disposed in a state of being rotated substantially 90°.

Figure 3:
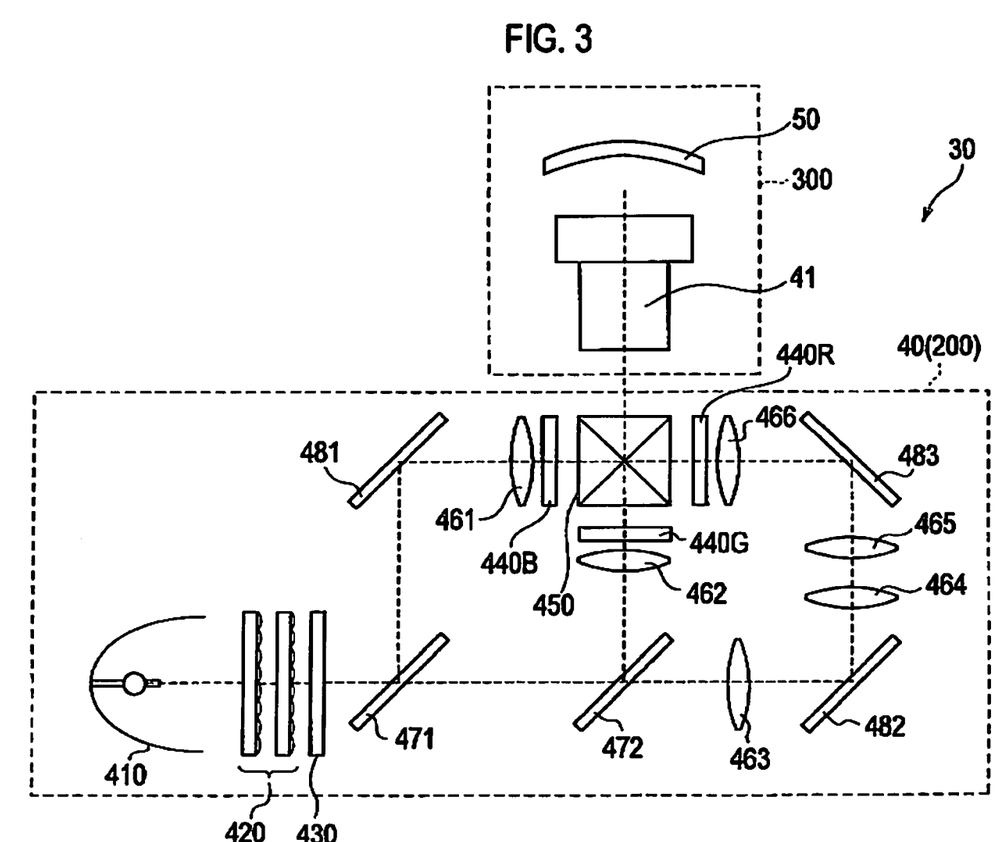
FIG. 3 is a view showing a configuration of a projection-type image display device 30 according to the first embodiment.

As shown in FIG. 3, the projection-type image display device 30 is configured of the image light generator 40 and the projection optics 300. Note that the protective cover 60 is omitted in FIG. 3. The image light generator 40 has a power circuit (not shown) and an image signal processing circuit (not shown) in addition to an optical engine 200.

As shown in FIG. 3, the optical engine 200 has a light source 410, a pair of fly-eye lenses 420, a PBS array 430, a plurality of optical modulators 440 (an optical modulator 440R, an optical modulator 440G, and an optical modulator 440B), and a cross dichroic prism 450.

The light source 410 is a UHP lamp configured of a burner and a reflection mirror.

Each of the fly-eye lenses 420 is formed of a group of minimal lenses and uniform light beams outputted from the light source 410.

The PBS array 430 is an element for aligning the polarization directions of the light beams outputted from the pair of fly-eye lenses 420.

Each of the optical modulators 440 is an element for modulating each color component light based on an image signal. The optical modulator 440 is, for example, a liquid crystal panel.

The cross dichroic prism 450 combines the light beams outputted from each of the optical modulators 440. Specifically, the cross dichroic prism 450 reflects a red component light outputted from the optical modulator 440R and a blue component light outputted from the optical modulator 440B. On the other hand, the cross dichroic prism 460 allows light outputted from the optical modulator 440G to pass therethrough. Note that the light combined by the cross dichroic prism 450 enters the projection lens 41.

The optical engine 200 has a plurality of lens groups (lenses 461 to 466) and a plurality of mirror groups (mirrors 471, 472, and 481 to 483).

The lens 461 is a condenser lens to cause the blue component light to be substantially parallel beams so that the optical modulator 440B would be irradiated with the blue component light. The lens 462 is a condenser lens to cause the green component light to be substantially parallel beams so that the optical modulator 440G would be irradiated with the green component light. The lens 466 is a condenser lens to cause the red component light to be substantially parallel beams so that the optical modulator 440R would be irradiated with the red component light.

The lenses 463 to 465 are relay lenses to adjust a difference between the optical path length of each of the blue component light and the green component light, and the optical path length of the red component light.

The mirror 471 is a dichroic mirror to reflect the blue component light and to transmit the red component light and the green component light. The mirror 472 is a dichroic mirror to reflect the green component light and to transmit the red component light.

The mirror 481 is a mirror to reflect the blue component light to lead the blue component light to the optical modulator 440B. The mirrors 482 and 483 are mirrors to reflect the red component light to lead the red component light to the optical modulator 440R.

Note that in the first embodiment, the UHP lamp is used as the light source 410, but the configuration is not limited to this. Specifically, a solid light source such as an LED (a light emitting diode) or an LD (a laser diode) may be used as the light source 410. In this case, it is also possible that a configuration of an optical system does not include fly-eye lenses 420, a PBS array 430, a plurality of lens groups, and a plurality of mirror groups.

As shown in FIG. 3, the projection optics 300 has the projection lens 41 and the aspherical mirror 50. The projection lens 41 outputs the light (the image light) combined by the cross dichroic prism 450 provided in the optical engine 200, to the aspherical mirror 50 side. The aspherical mirror 50 causes the image light outputted from the projection lens 41 to have a wider angle and reflects the image light to the screen 11 side.

The aspherical mirror 50 is attached to arm members 52a and 52b which are fixed on a wall surface of the projection-type image display device 30. The aspherical mirror 50 is an aspherical mirror to condense light outputted from the projection lens 41 and to reflect the light to the screen 11 side.

Note that in the first embodiment, the mirror provided in a rear stage of the projection optics 300 is the aspherical mirror 50 but is not limited to this. Specifically, the mirror provided in the rear stage of the projection optics 300 may be a free-form surface mirror.

Returning to FIG. 2, the protective cover 60 is provided on the optical path of the image light reflected by the aspherical mirror 50. Specifically, the protective cover 60 is provided beneath the projection-type image display device 30 and covers a lower portion of the aspherical mirror 50 so as to prevent the aspherical mirror 50 from being touched by a user. The protective cover 60 is formed of a light transmitting member such as a transparent resin or a glass and transmits the image light reflected by the aspherical mirror 50.

Here, since optical characteristics (such as a refractive index) of the image light irradiated onto the screen 11 vary depending on the kind of the light transmitting member forming the protective cover 60, it is preferable that an optical design for the projection optics 300 be made in consideration of the kind of the light transmitting member forming the protective cover 60.

(Advantageous Effects)

According to the projection-type image display device 30 of the first embodiment, the protective cover 60 is provided on the optical path of the image light reflected by the aspherical mirror 50. Thus, the user is less likely to touch the aspherical mirror 50 to cause any change in an angle of the aspherical mirror 50 or the like. Since the protective cover 60 is formed of the light transmitting member transmitting the image light reflected by the aspherical mirror 50, the image light irradiating onto the screen 11 is not interrupted by the protective cover 60. Accordingly, positioning accuracy of the reflection mirror provided to shorten the distance between the projection-type image display device 30 and the screen 11 can be preferably maintained.

Second Embodiment

A second embodiment of the present invention will be described below by referring to the drawings. In the following, differences between the first embodiment and the second embodiment will be described by referring to the drawings.

Specifically, in the above-mentioned first embodiment, the protective cover 60 protecting the aspherical mirror 50 is formed of the light transmitting member. In contrast, in the second embodiment, a protective cover 160 has an opening through which image light condensed by an aspherical mirror 50 passes. Note that the protective cover 160 does not need to be formed of a light transmitting member.

(Configuration of a Projection-Type Image Display System)

Figure 4:
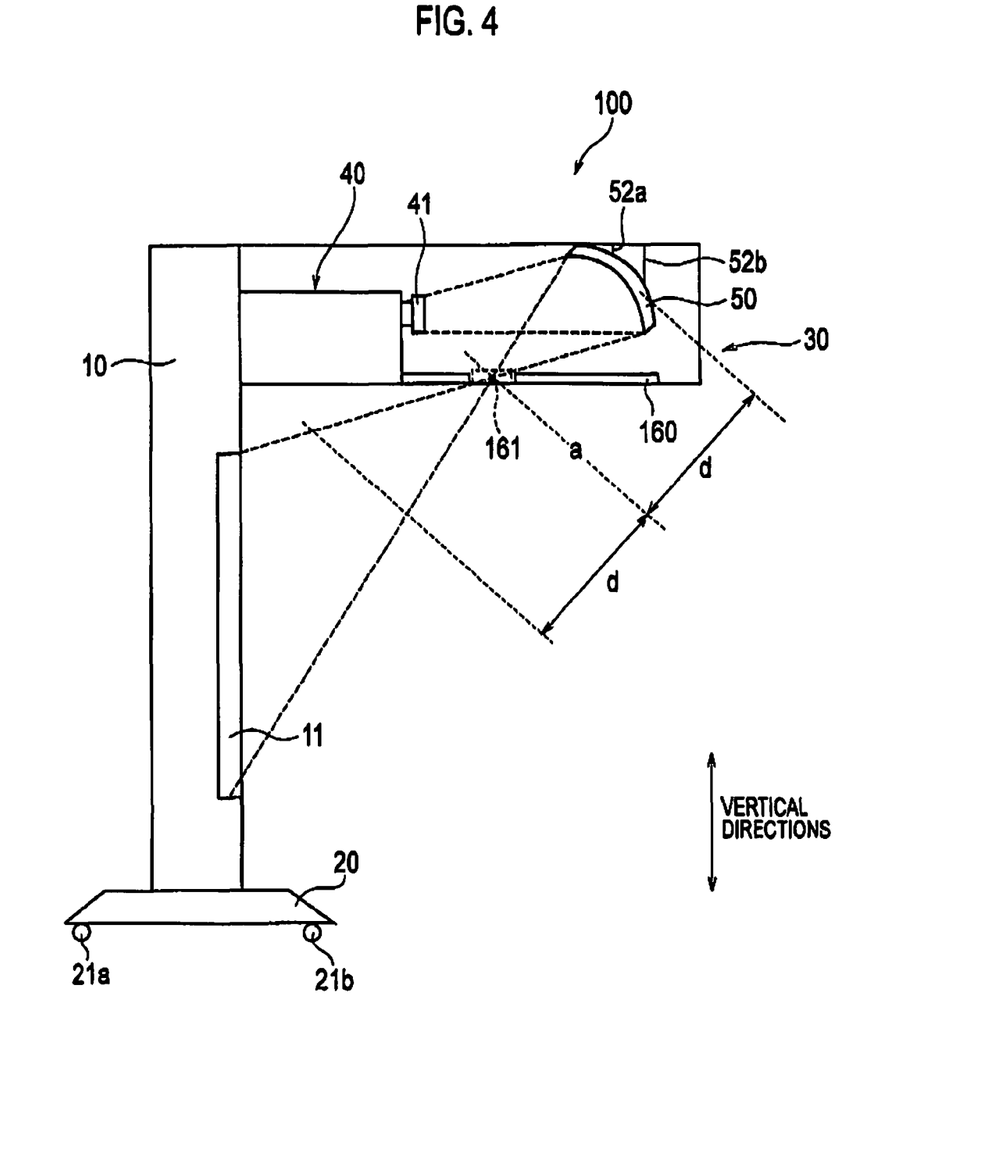
FIG. 4 is a view (seen from a side) showing a configuration of a projection-type image display system 100 according to a second embodiment.

A configuration of a projection-type image display system according to the second embodiment of the present invention will be described below by referring to the drawings. FIG. 4 is a view showing a configuration of a projection-type image display system 100 according to the second embodiment. Note that in FIG. 4, similar reference numerals are given to denote components similar to those of FIG. 2. As shown in FIG. 4, the projection-type image display system 100 has a protective cover 160 in place of a protective cover 60.

(Configurations of an Aspherical Mirror and a Protective Cover)

Configurations of an aspherical mirror and a protective cover according to the second embodiment will be described below by referring to FIGS. 5 to 7.

Figure 5:
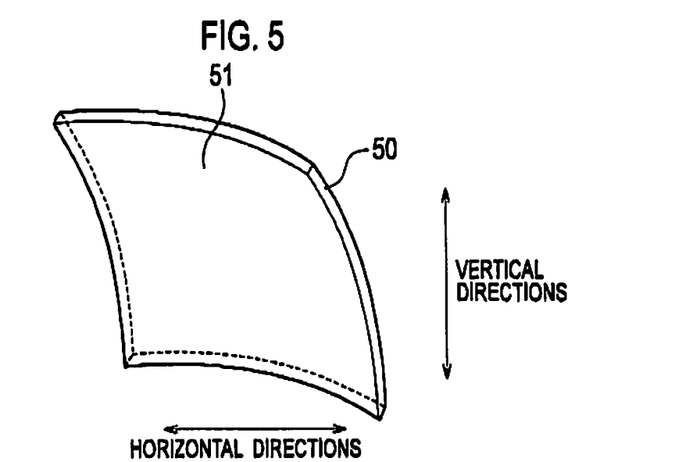
FIG. 5 is a view showing an aspherical mirror 50 according to the second embodiment.

As shown in FIG. 5, an aspherical mirror 50 is a mirror having a curved surface 51 which is curved in horizontal directions and in vertical directions of a projection-type image display system 100. Image light reflected by the curved surface 51 of the aspherical mirror 50 is projected onto a screen 11 after being condensed on a light-condensing surface a. The light-condensing surface a is a surface where the broadening of a light flux of the image light becomes the smallest.

Figure 6:
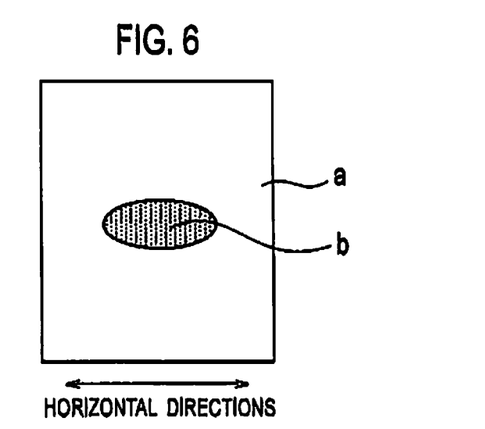
FIG. 6 is a view showing a light-condensing surface a according to the second embodiment.

Specifically, as shown in FIG. 6, on the light-condensing surface a, the image light reflected by the curved surface 51 of the aspherical mirror 50 is condensed in a region b having a particular shape depending on a shape of the curved surface 51 of the aspherical mirror 50. Note that in FIG. 6, the region b is shown as a region having an elliptic shape for simplicity, but the actual shape of the region b becomes a more complicated shape.

The protective cover 160 has an opening 161 communicating from an aspherical mirror 50 side to a screen 11 side. The image light reflected by the curved surface 51 of the aspherical mirror 50 is irradiated onto the screen 11 through the opening 161 provided in the protective cover 160.

Figure 7:
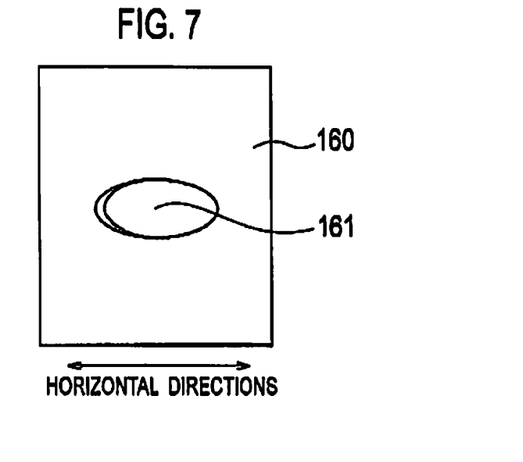
FIG. 7 is a view showing a protective cover 160 according to the second embodiment.

Specifically, as shown in FIG. 7, the protective cover 160 is provided with the opening 161 depending on a particular shape of the image light condensed in the region b. A size of the opening 161 is at least larger than that of the region b in which the image light is condensed on the light-condensing surface a. However, as long as the image light reflected by the curved surface 51 of the aspherical mirror 50 is transmittable, a shape of the opening 161 can be any shape.

In addition, it is preferable that the opening 161 be provided in the vicinity of the light-condensing surface a to minimize the size of the opening 161. Here, the vicinity of the light-condensing surface a means that a distance from the light-condensing surface a is in a range of "d". Here, "d"

indicates a distance between the aspherical mirror 50 and the light-condensing surface a on a main light beam of light beams passing through the centers of optical modulators 440.
(Advantageous Effects)

According to the projection-type image display device 30 of the second embodiment, the aspherical mirror 50 condenses the image light outputted from the projection lens 41 in the region b on the light-condensing surface a. Thus, the opening 161 provided in the protective cover 160 can be minimized. Therefore, even when the opening 161 is provided in the protective cover 160, a possibility of a user touching the aspherical mirror 50 can be reduced.

In addition, in a case where a transmissive region of the protective cover 160 is formed of a light transmitting member, an optical design for a projection optics 300 has to be made depending on the kind of the light transmitting member. In contrast, according to the projection-type image display device 30 of the second embodiment, the transmissive region of the protective cover 160 is the opening 161, and there is no need to consider the kind of the light transmitting member. Thus, the optical design for the projection optics 300 is made easier.

Third Embodiment

A third embodiment of the present invention will be described below by referring to the drawings. The description will be mainly given to differences between the above-mentioned second embodiment and the third embodiment.

Specifically, in the above-mentioned second embodiment, the aspherical mirror 50 is a mirror having the curved surface 51 which is curved in the vertical directions and in the horizontal directions of the projection-type image display system 100. In contrast, in the third embodiment, an aspherical mirror 50 is a mirror having a curved surface 51 which is only curved in vertical directions of a projection-type image display system 100.

In addition, in the above-mentioned second embodiment, the protective cover 160 is provided with the opening 161 having a particular shape depending on a shape of the curved surface 51 of the aspherical mirror 50. In contrast, a protective cover 160 of the third embodiment is provided with an opening 161 having a long rectangular shape in horizontal directions of the projection-type image display system 100.
(Configurations of an Aspherical Mirror and a Protective Cover)

Configurations of an aspherical mirror and a protective cover according to the third embodiment will be described below by referring to FIGS. 8 to 10.

Figure 8:
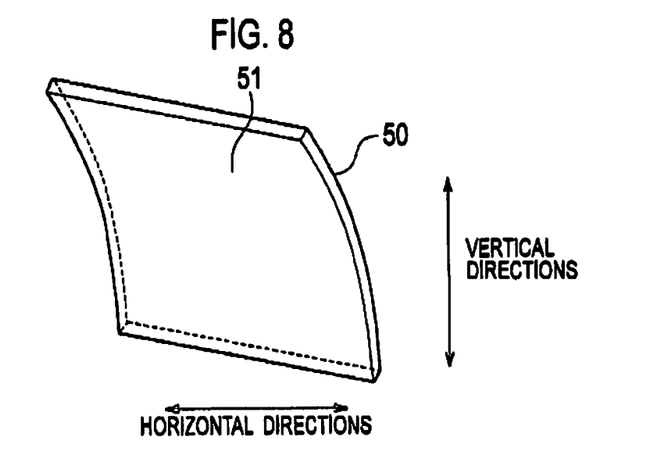
FIG. 8 is a view showing an aspherical mirror 50 according to a third embodiment.

As shown in FIG. 8, the aspherical mirror 50 is a mirror having a curved surface 51 which is only curved in vertical directions of the projection-type image display system 100. Similar to the second embodiment, image light reflected by the curved surface 51 of the aspherical mirror 50 is projected onto a screen 11 after being condensed on a light-condensing surface a.

Figure 9:
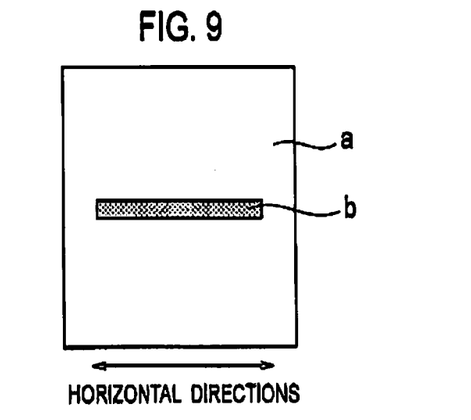
FIG. 9 is a view showing a light-condensing surface a according to the third embodiment.

Specifically, as shown in FIG. 9, on the light-condensing surface a, the image light reflected by the curved surface 51 of the aspherical mirror 50 is condensed in a region b having a particular shape depending on a shape of the curved surface 51 of the aspherical mirror 50. Note that in FIG. 9, the region b is shown as a region having a long rectangular shape in horizontal directions of the projection-type image display system 100 for simplicity, but the actual shape of the region b becomes a more complicated shape.

Similar to the second embodiment, the protective cover 160 has an opening 161 communicating from an aspherical mirror 50 side to a screen 11 side. The image light reflected by the curved surface 51 of the aspherical mirror 50 is irradiated onto the screen 11 through the opening 161 provided in the protective cover 160.

Figure 10:
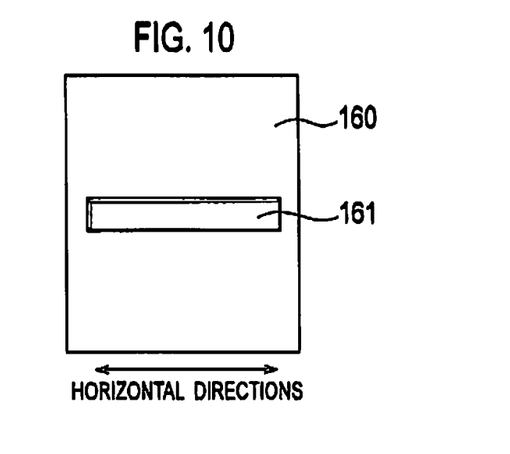
FIG. 10 is a view showing a protective cover 160 according to the third embodiment.

Specifically, as shown in FIG. 10, the protective cover 160 is provided with an opening 161 having a long rectangular shape in horizontal directions of the projection-type image display system 100. A size of the opening 161 is at least larger than that of the region b in which the image light is condensed on the light-condensing surface a. However, as long as the image light reflected by the curved surface 51 of the aspherical mirror 50 is transmittable, a shape of the opening 161 can be any shape.

Fourth Embodiment

A fourth embodiment of the present invention will be described below by referring to the drawings. In the following, the description will be mainly given to differences between the above-mentioned second so embodiment and the fourth embodiment.

Specifically, in the above-mentioned second embodiment, the image light outputted from the projection lens 41 is reflected only once. In contrast, the image light outputted from a projection lens 41 of the fourth embodiment is reflected for a plurality of times (three times).
(Configuration of a Projection-Type Image Display System)

Figure 11:
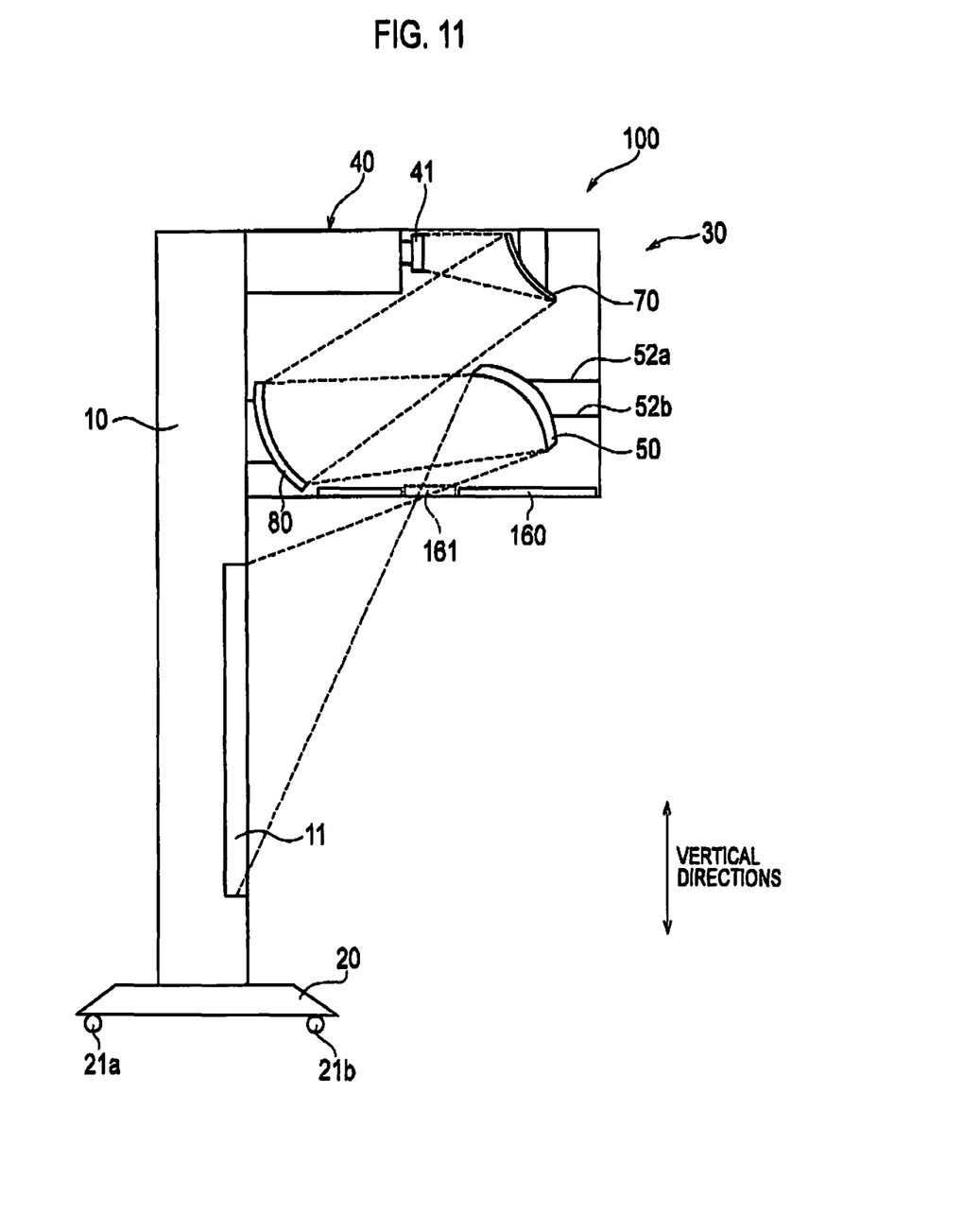
FIG. 11 is a view (seen from a side) showing a configuration of a projection-type image display system 100 according to a fourth embodiment.

A configuration of a projection-type image display system according to the fourth embodiment will be described below by referring to the drawings. FIG. 11 is a view (seen from a side) showing a configuration of a projection-type image display system 100 according to the fourth embodiment. Note that in FIG. 11, similar reference numerals are given to denote components similar to those of FIG. 2.

As shown in FIG. 11, the projection-type image display system 100 has reflection mirrors 70 and 80 in addition to the configuration of FIG. 2.

The reflection mirror 70 is a convex mirror reflecting image light outputted from a projection lens 41 to the reflection mirror 80 side. In addition, since the reflection mirror 70 is a convex mirror, the image light outputted from the projection lens 41 is enlarged. The reflection mirror 80 is a concave mirror reflecting the image light reflected by the reflection mirror 70 to an aspherical mirror 50 side. Note that the projection lens 41, the reflection mirrors 70 and 80, and the aspherical mirror 50 configure a projection optics.
(Advantageous Effect)

According to a projection-type image display device 30 of the fourth embodiment, the image light outputted from the projection lens 41 is reflected not only by the aspherical mirror 50 but also by the reflection mirrors 70 and 80. Thus, even if a size in a depth direction of the projection-type image display device 30 is set to be small, the projection-type image display device 80 can sufficiently enlarge and project the image light outputted from the projection lens 41 on a screen 11.

Fifth Embodiment

A fifth embodiment of the present invention will be described below by referring to the drawings. In the following, the description will be mainly given to differences between the above-mentioned first embodiment and the fifth embodiment.

Specifically, in the fifth embodiment, an effective display region of a modulator 440 is provided in a portion lower than a projection lens 41, which is not particularly mentioned in the first embodiment.

(Configuration of an Image Light Outputting Device)

Figure 12:
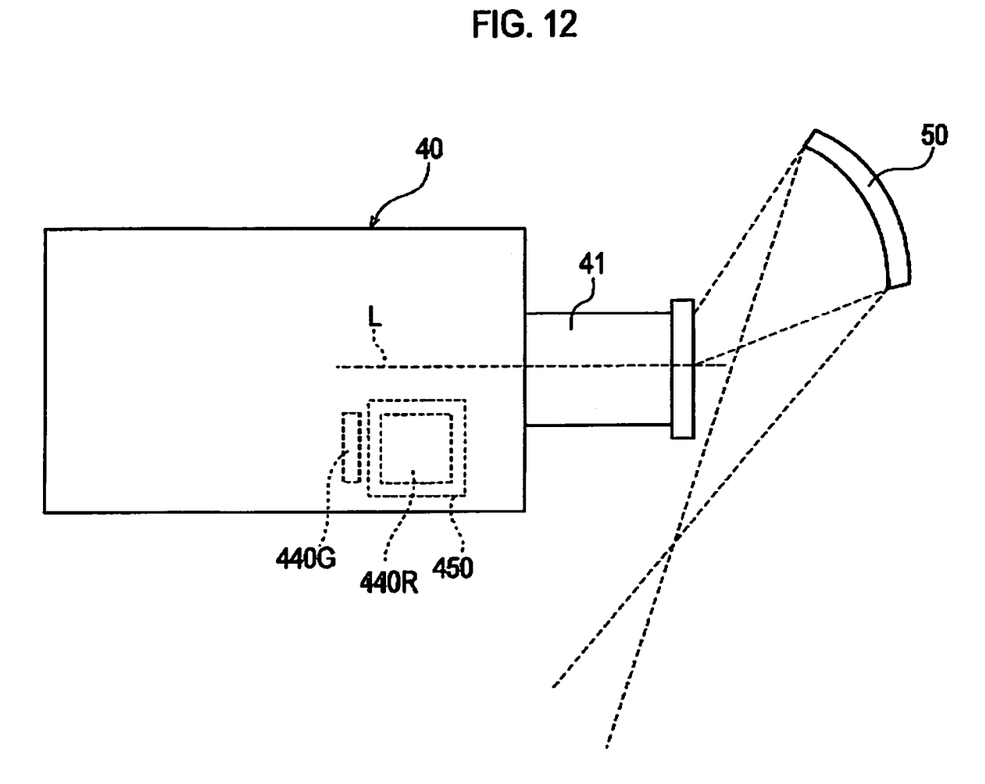
FIG. 12 is a view showing a configuration of an image light generator 40 according to a fifth embodiment.

A configuration of an image light outputting device according to the fifth embodiment will be described below by referring to the drawings. FIG. 12 is a view showing a configuration of an image light generator 40 according to the fifth embodiment. Here, the image light generator 40 has a configuration similar to that of FIG. 3. Note that in FIG. 12, only components necessary for the description of the fifth embodiment are shown.

As shown in FIG. 12, in the image light generator 40, an effective display region of an optical modulator 440 is provided in a portion lower than a projection lens 41. Specifically, the effective display region of the optical modulator 440 is provided in a portion lower than the center L of an optical axis of the projection lens 41.

With this, the image light outputted from the projection lens 41 is outputted obliquely upward from the projection lens 41. Thus, an aspherical mirror 50 reflecting the image light outputted from the projection lens 41 to a screen 11 (not shown in FIG. 12) side is provided in a position obliquely upward of the projection lens 41.

(Advantageous Effects)

According to the fifth embodiment, the effective display region of the optical modulator 440 is provided in a portion lower than the projection lens 41. Thus, the image light outputted from the projection lens 41 is outputted obliquely upward from the projection lens 41. Accordingly, wider oblique projection can be achieved, so that the distance between the projection-type image display device and the screen can be further shortened.

Sixth Embodiment

A sixth embodiment of the present invention will be described below by referring to the drawings. The sixth embodiment is a combination of the first and fifth embodiments.

(Configuration of a Projection-Type Image Display System)

Figure 13:
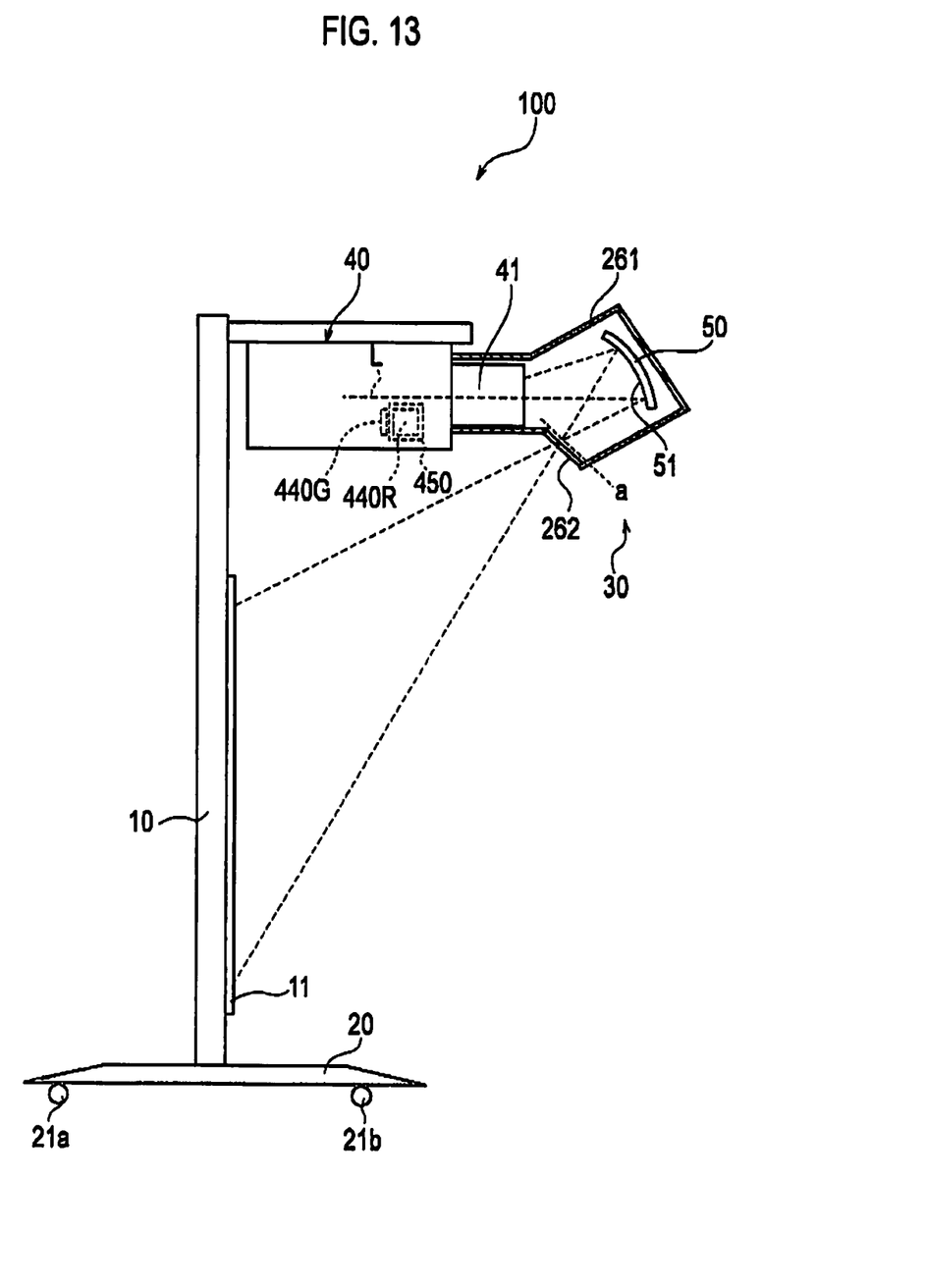
FIG. 13 is a view (seen from a side) showing a configuration of a projection-type image display system 100 according to a sixth embodiment.

A configuration of a projection-type image display system according to the sixth embodiment will be described below by referring to the drawings. FIG. 13 is a view (seen from a side) showing a configuration of a projection-type image display system 100 according to the sixth embodiment. Note that in FIG. 13, similar reference numerals are given to denote components similar to those of FIG. 2.

As shown in FIG. 13, in the projection-type image display system 100, protective covers 261 and 282 are provided so as to cover a projection lens 41 and an aspherical mirror 50. The protective cover 262 is provided in the vicinity of a light-condensing surface a and is formed of a light transmitting member. The protective cover 262 has a shape capable of transmitting a light flux having a particular shape, which is condensed depending on the form of a curved surface 61 of the aspherical mirror 50. However, as long as image light reflected by the curved surface 51 of the aspherical mirror 50 is transmittable, the shape of the protective cover 262 can be any shape.

As a matter of course, the protective cover 261 does not need to be formed of a light-transmitting member. The aspherical mirror 50 is held inside the protective cover 261 by a holding mechanism provided inside the protective cover 261.

Seventh Embodiment

A seventh embodiment of the present invention will be described below by referring to the drawings. The seventh embodiment is a combination of the second and fifth embodiments.

(Configuration of a Projection-Type Image Display System)

Figure 14:
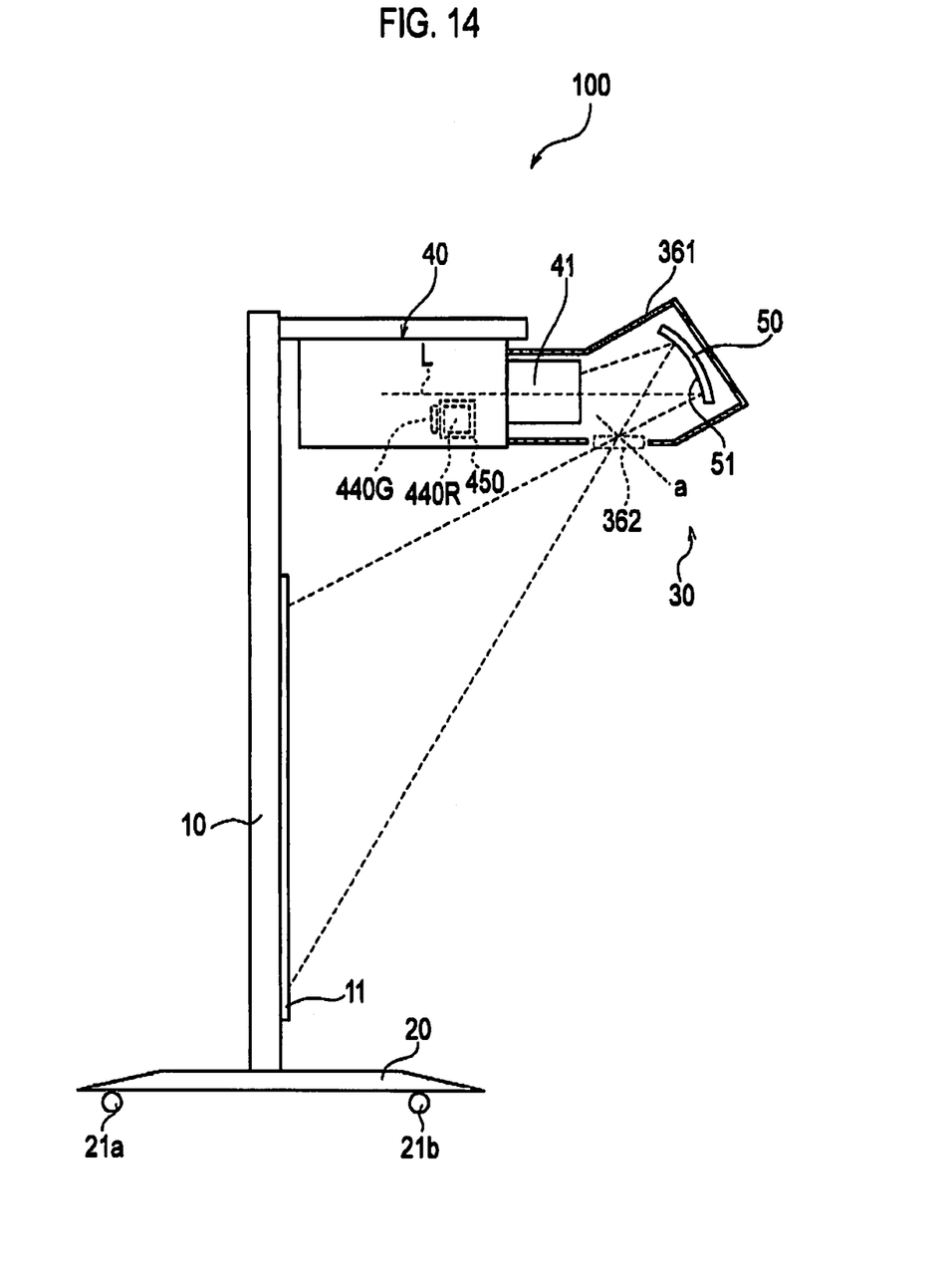
FIG. 14 is a view (Been from a side) showing a configuration of a projection-type image display system 100 according to a seventh embodiment.

A configuration of a projection-type image display system according to the seventh embodiment will be described below by referring to the drawings. FIG. 14 is a view (seen form a side) showing a configuration of a projection-type image display system 100 according to the seventh embodiment. Note that in FIG. 14, similar reference numerals are given to denote components similar to those of FIG. 4.

As shown in FIG. 14, in the projection-type image display system 100, a protective cover 361 is provided so as to cover a projection lens 41 and an aspherical mirror 50. The protective cover 361 has an opening 862 in the vicinity of a light-condensing surface a. The opening 362 has a shape capable of transmitting a light flux having a particular shape, which is condensed depending on the form of a curved surface 51 of the aspherical mirror 50. However, as long as image light reflected by the curved surface 51 of the aspherical mirror 50 is transmittable, the shape of the opening 362 can be any shape.

The aspherical mirror 50 is held inside the protective cover 361 by a holding mechanism provided inside the protective cover 361.

Eighth Embodiment

An eighth embodiment of the present invention will be described below by referring to the drawings. In the following, the description will be mainly given to differences between the above-mentioned sixth embodiment and the eighth embodiment.

Specifically, in the above-mentioned sixth embodiment, the protective cover 262 formed of a light-transmitting member is provided in the vicinity of the light-condensing surface a. In contrast, in the eighth embodiment, a concave lens for projecting image light with a more wider angle is provided in the vicinity of the light-condensing surface a. Specifically, it is preferable that the concave lens be disposed on a side between the light condensing surface a and the screen 11, within a range "d" that extends on either side of the light-condensing surface a.

(Configuration of a Projection-Type Image Display System)

Figure 15:
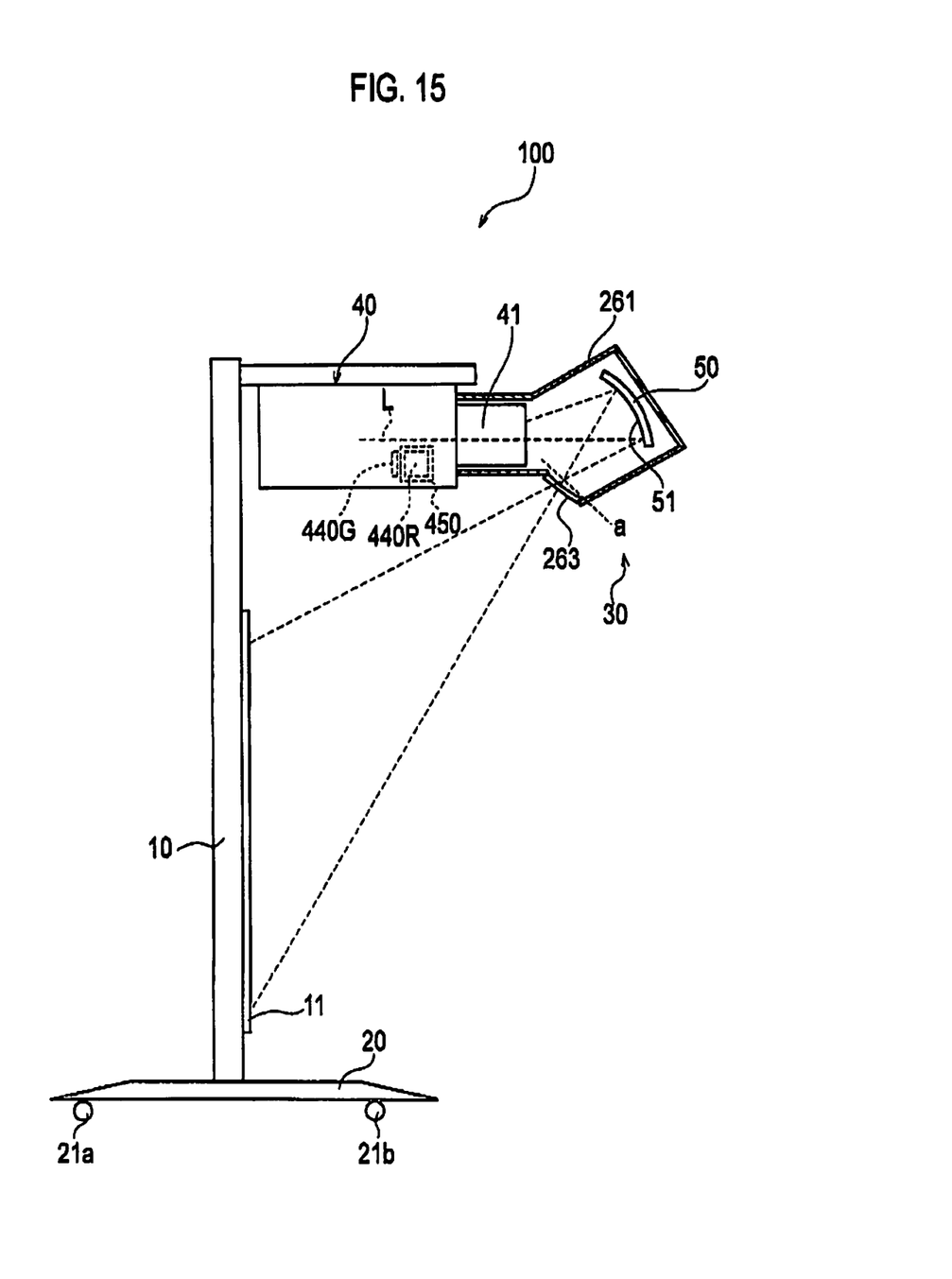
FIG. 15 is a view (seen from a aide) showing a configuration of a projection-type image display system 100 according to an eighth embodiment.

A configuration of a projection-type image display system according to the eighth embodiment will be described below by referring to the drawings. FIG. 15 is a view (seen from a side) showing a configuration of a projection-type image display system 100 according to the eighth embodiment. Note that in FIG. 15, similar reference numerals are given to denote components similar to those of FIG. 13.

As shown in FIG. 15, in the projection-type image display system 100, a concave lens 263 is provided in place of a protective cover 262 formed of a light-transmitting member.

The concave lens 263 is provided in the vicinity of the light-condensing surface a. Specifically, the concave lens 263 is disposed on a side between the light condensing surface a and the screen 11, within a range "d" that extends on either side of the light-condensing surface a. The concave lens 263 is configured so as to condense image light reflected by an aspherical mirror 50. The concave lens 263 preferably has a concave surface on the aspherical mirror 50 side, and plane surface on the screen 11 side. The projection optics is preferably surrounded with the protective cover 261 of flat shape. That is, the projection optics is surrounded with the plane surface provided on the concave lens 263 and the protective cover 261 of flat shape. Therefore, accumulation of dusts on the exterior surface of the protective cover 261 and the concave lens 263 may be suppressed.

In the eighth embodiment, a projection lens 41, the aspherical mirror 50 and the concave lens 263 configure a projection optics 300 projecting the image light onto the screen 11.

In addition, in the eighth embodiment, the concave lens 263 is used in place of the protective cover 262, but the configuration is not limited to this. Specifically, an aspherical lens or a free-form surface lens may be used in place of the protective cover 262.

In this manner, since the concave lens 263 is provided in the vicinity of the light-condensing surface a, the distance between a projection-type image display device and the screen can be further shortened when compared with the distance in the sixth embodiment.

the concave lens 263 is disposed on a side between the light condensing surface a and the screen 11, within a range "d" that extends on either side of the light-condensing surface a. That is, the concave lens 263 condenses re-scattered image light after the image light is condensed on the light-condensing surface a. Thus, an effect of a wider angle by use of the concave lens 263 can be further achieved.

Ninth Embodiment

A ninth embodiment of the present invention will be described below by referring to the drawings. In the following, the description will be mainly given to differences between the above-mentioned seventh embodiment and the ninth embodiment.

Specifically, in the above-mentioned seventh embodiment, the projection optics 300 is configured of the projection lens 41 and the aspherical mirror 50. In contrast, in the ninth embodiment, a projection optics 300 does not include a projection lens 41 and is configured of a plurality of mirror groups.

(Configuration of a Projection-Type Image Display System)

Figure 16:
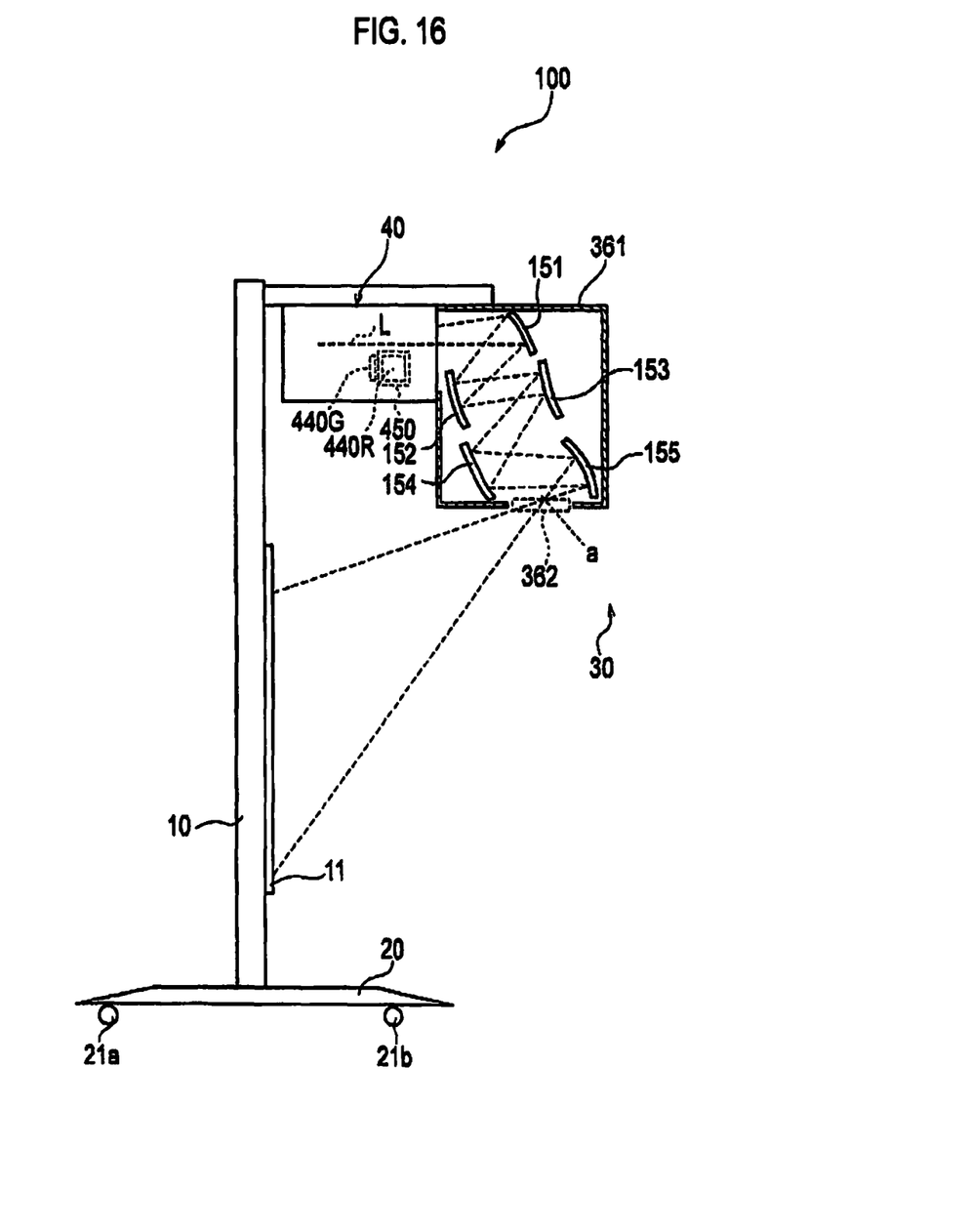
FIG. 16 is a view (seen from a side) showing a configuration of a projection-type image display system 100 according to a ninth embodiment.

A configuration of a projection-type image display system according to the ninth embodiment will be described below by referring to the drawings. FIG. 16 is a view (seen from a side) showing a configuration of a projection-type image display system 100 according to the ninth embodiment. Note that in FIG. 16, similar reference numerals are given to denote components similar to those of FIG. 14.

As shown in FIG. 16, in the projection-type image display system 100, a plurality of mirror groups (mirrors 151 to 155) is provided in place of a projection lens 41 and an aspherical mirror 50. Note that the mirrors 151 to 155 configure a projection optics 300.

In the ninth embodiment, the mirrors 151, 152, 154, and 155 are concave lenses and the mirror 153 is a convex lens, but of course, the combination of the mirrors is not limited to this.

In the ninth embodiment, an opening 362 is provided in the vicinity of the light-condensing surface a, but the configuration is not limited to this. Specifically, like the sixth embodiment, a protective cover 262 formed of a light-transmitting member may be provided in the vicinity of the light-condensing surface a. Or, like the eighth embodiment, a concave lens 263 condensing image light reflected by the mirror 155 provided in the last stage of the projection optics 300 may be provided in the vicinity of the light-condensing surface a.

Other Embodiments

The present invention has been described by the above-mentioned embodiments, but the description and drawings which constitute a part of this disclosure should not be understood as to limit the scope of the present invention. For those who are skilled in the art, various alternative embodiments, examples, and operating techniques will be apparent from this disclosure.

For example, in the above-mentioned first embodiment, the entire protective cover is formed of a light-transmitting member, but the configuration is not limited to this. Specifically, it is only needed that a protective cover has a transmissive region transmitting image light condensed by an aspherical mirror 50 and only the transmissive region is formed of a light-transmitting member. Since the aspherical mirror 50 condenses the image light, the size of the transmissive region can be minimized, so that the light-transmitting member forming the transmissive region can be easily maintained.

In the second and third embodiments, shapes of the openings 161 provided in the protective covers 160 are an elliptical shape and a rectangular shape which is long in horizontal directions of the projection-type image display system 100, but are not limited to those. Specifically, the shape of the opening 161 provided in the protective cover 160 is determined depending on the shape of condensed image light (a region b) condensed by the aspherical mirror 50 on the light-condensing surface a.

In the second to eighth embodiments, an aspherical mirror is used as a mirror reflecting image light outputted from a projection lens 41 to the screen 11 side, but the mirror is not limited to this. Specifically, a free-form surface mirror may be used as a mirror reflecting the image light outputted from the projection lens 41 to the screen 11 side. If an aberration and a resolution can be adjusted, a spherical mirror may be used as a mirror reflecting the image light outputted from the projection lens 41 to the screen 11 side.

According to each of the above-mentioned embodiments, a reflection mirror is provided so that a distance between a projection-type image display device and a screen can be shortened. Thus, it is less likely that image light is interrupted by a person or the like coming in between the projection-type image display device and the screen. In addition, in a case where an LD is used as a light source 410, the possibility that a person is accidentally irradiated with the laser beam (image light) can be reduced.

In the above-described embodiments, the display system provided with the screen of reflective type is explained. However, a screen of transmitting type may be applicable.

What is claimed is:

1. A projection-type image display device comprising:
   an optical engine configured to project the image light onto a screen, wherein
   the projection optics includes a reflection mirror configured to reflect the image light from the optical engine toward the screen,
   the reflection mirror is surrounded by a protective cover having a transmissive region transmitting the image light reflected by the reflection mirror, and
   the transmissive region is arranged obliquely to a vertical plane and a horizontal plane,
   wherein the vertical plane is perpendicular to a central optical axis line of the projection optics and the horizontal plane is perpendicular to the vertical plane, wherein
   the reflection mirror condenses the image light, and
   the transmissive region is provided at the screen side more than a light condensing surface where a broadening of the image light is the smallest.

2. The projection-type image display device according to claim 1, wherein
   the optical engine includes an UHP lamp.

3. The projection-type image display device according to claim 1, wherein the projection optics includes a projection lens that outputs the image light from the optical engine toward the reflection mirror, the optical engine includes an optical modulator configured to modulate light in accordance with an image signal, and an effective display region of the optical modulator is shifted from an optical axis of the projection lens.

4. A projection-type image display device comprising:

an optical engine configured to generate image light; and a projection optics configured to project the image light onto a screen, wherein the projection optics includes a reflection mirror configured to reflect the image light from the optical engine toward the screen, the reflection mirror is surrounded by a protective cover having a transmissive region transmitting the image light reflected by the reflection mirror, and the transmissive region is provided at the screen side more than a light-condensing surface where a broadening of the image light is the smallest and arranged obliquely to a vertical plane and a horizontal plane, wherein the vertical plane is perpendicular to a central optical axis line of the projection optics and the horizontal plane is perpendicular to the vertical plane.

5. The projection-type image display device according to claim 4, wherein the optical engine includes an UHP lamp.

6. The projection-type image display device according to claim 4, wherein the projection optics includes a projection lens that outputs the image light from the optical engine toward the reflection mirror, the optical engine includes an optical modulator configured to modulate light in accordance with an image signal, and an effective display region of the optical modulator is shifted from an optical axis of the projection lens.

7. A projection-type image display device comprising:

an optical engine configured to generate image light; and a projection optics configured to project the image light onto a screen, wherein the projection optics includes an aspherical reflection mirror configured to reflect the image light from the optical engine at an oblique angle toward the screen, the aspherical reflection mirror is physically protected by a protective cover having a transmissive region transmitting the image light reflected by the aspherical reflection mirror, and the transmissive region comprises a light condensing surface where the broadening of a light flux of the image light becomes the smallest and is arranged obliquely to a vertical plane and a horizontal plane.

8. The projection-type image display device according to claim 7, wherein the aspherical reflection mirror condenses the image light onto the light condensing surface, and the transmissive region is provided more at the screen side compared to the light-condensing surface.

9. The projection-type image display device according to claim 7, wherein the optical engine includes an UHP lamp.

10. The projection-type image display device according to claim 7, wherein the projection optics includes a projection lens that outputs the image light from the optical engine toward the aspherical reflection mirror, the optical engine includes an optical modulator configured to modulate light in accordance with an image signal, and an effective display region of the optical modulator is shifted from an optical axis of the projection lens.

11. The projection-type image display device according to claim 7, wherein the light-condensing surface has a particular shape that corresponds with the shape of the aspherical reflection mirror.

12. The projection-type image display device according to claim 11, wherein the light-condensing surface is a virtual surface and the light-condensing surface comprises a physical opening communicating from the mirror side to a screen side.

13. The projection-type image display device according to claim 12, wherein the physical opening corresponds with the shape of the image light.

14. The projection-type image display device according to claim 13, wherein the size of the physical opening is at least larger than that of the region in which the image light is condensed on the light-condensing surface.

* * * * *